May 24, 1966  J. LABRUYERE  3,252,379
FEELERS OF THE ELECTRICAL-SEQUENCE TYPE FOR MACHINE TOOLS
Filed April 23, 1964  3 Sheets-Sheet 1
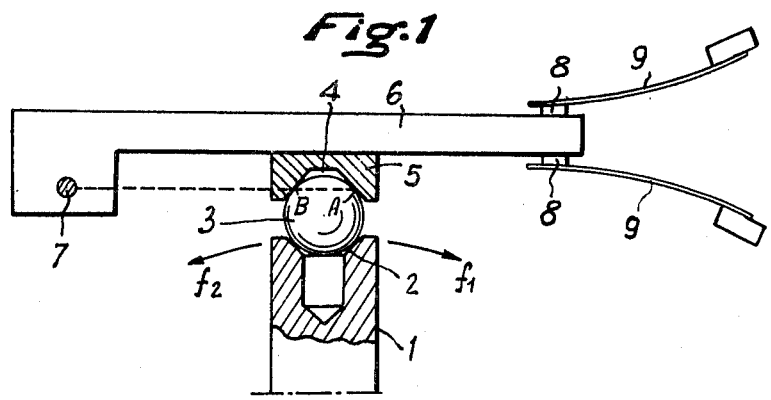
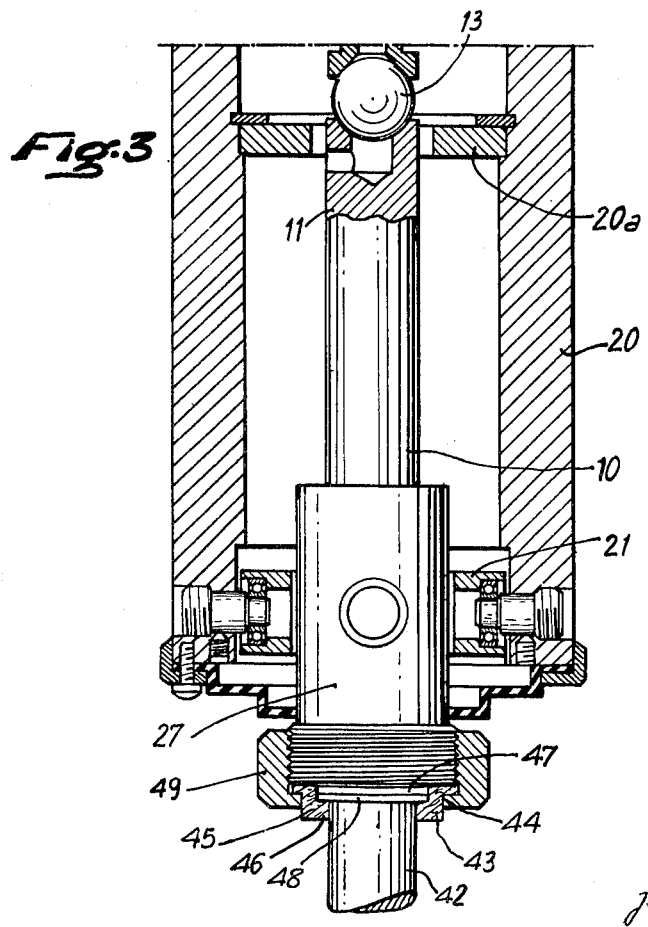
Inventor
Jean Labruyere
by Michael J. Striker
Attorney May 24, 1966 J. LABRUYERE 3,252,379
FEELERS OF THE ELECTRICAL-SEQUENCE TYPE FOR MACHINE TOOLS
Filed April 23, 1964 3 Sheets-Sheet 3

United States Patent Office 3,252,379
Patented May 24, 1966

3,252,379
FEELERS OF THE ELECTRICAL-SEQUENCE TYPE FOR MACHINE TOOLS
Jean Labruyere, Paris, France, assignor to Franco-Belge de Materiel de Chemins de Fer, Paris, France, a company of France
Filed Apr. 23, 1964, Ser. No. 362,077
Claims priority, application France, Apr. 27, 1963, 932,947
4 Claims. (Cl. 90—62)

It is known, in a machine tool or the like, to control the relative movements of the tool and of the work by means of a feeler which follows the contour of a template, the movements of the feeler and of the tool being controlled simultaneously by drive means operated by contacts which come successively into action for increasing movements of the feeler, emitting sequences of signals which are transmitted to the said drive means, preferably through the agency of relays or the like. In these machines, the feeler is arranged so as to be capable of oscillating about a pivot point, one of its ends following the contour of the template, the other end acting on an arm pivoting about a horizontal axis, the end of this arm acting on the control contacts of the drive means.

This arrangement of a pivoting arm controlled directly by the oscillations of one end of the feeler is not very satisfactory, since the amplitude of the movement effected by this arm, and therefore the signal transmitted to the drive means, is not constant with respect to the oscillations of the feeler owing to the fact that the point of application of the force acting on the pivoting arm is displaced relatively to the axis of rotation in the sense of the oscillations of the end of the feeler. Therefore, the angular movement of the feeler and the angular movement of the pivoting arm do not exactly correspond, which is particularly prejudicial to the operation of machine tools which have to work with an accuracy of more than 1/100 of a millimetre.

The present invention relates to a device for the transmission of the movement of the feeler to a pivoting arm actuating the contacts of drive means which is such that the correspondence between the angular movement of the feeler and the corresponding angular movement of the pivoting arm is independent of the direction of angular movement of the said feeler. Such a feeler can operate selectively in one dimension, two dimensions or three dimensions.

For this purpose, a longitudinally slidable rod is interposed between the end of the feeler and the oscillating arm, and is arranged in such a manner that to each oscillation of the feeler there corresponds a rectilinear movement of this intermediate slide, the latter thus acting always on the same point of the pivoting arm.

The invention is also concerned with a safety device by means of which the feeler is disengaged from the periphery of the template when the oscillations of the feeler exceed the maximum travel distance which the said feeler can have mechanically.

By way of example, and in order to faciltiate the understanding of the specification, in the accompanying drawings:

FIGURE 1 is a diagrammatic view in partial section of a feeler of known type.

FIGURE 3 is a sectional view of the lower end of the feeler according to the invention provided with a mechanical safety device.

Figure 2:
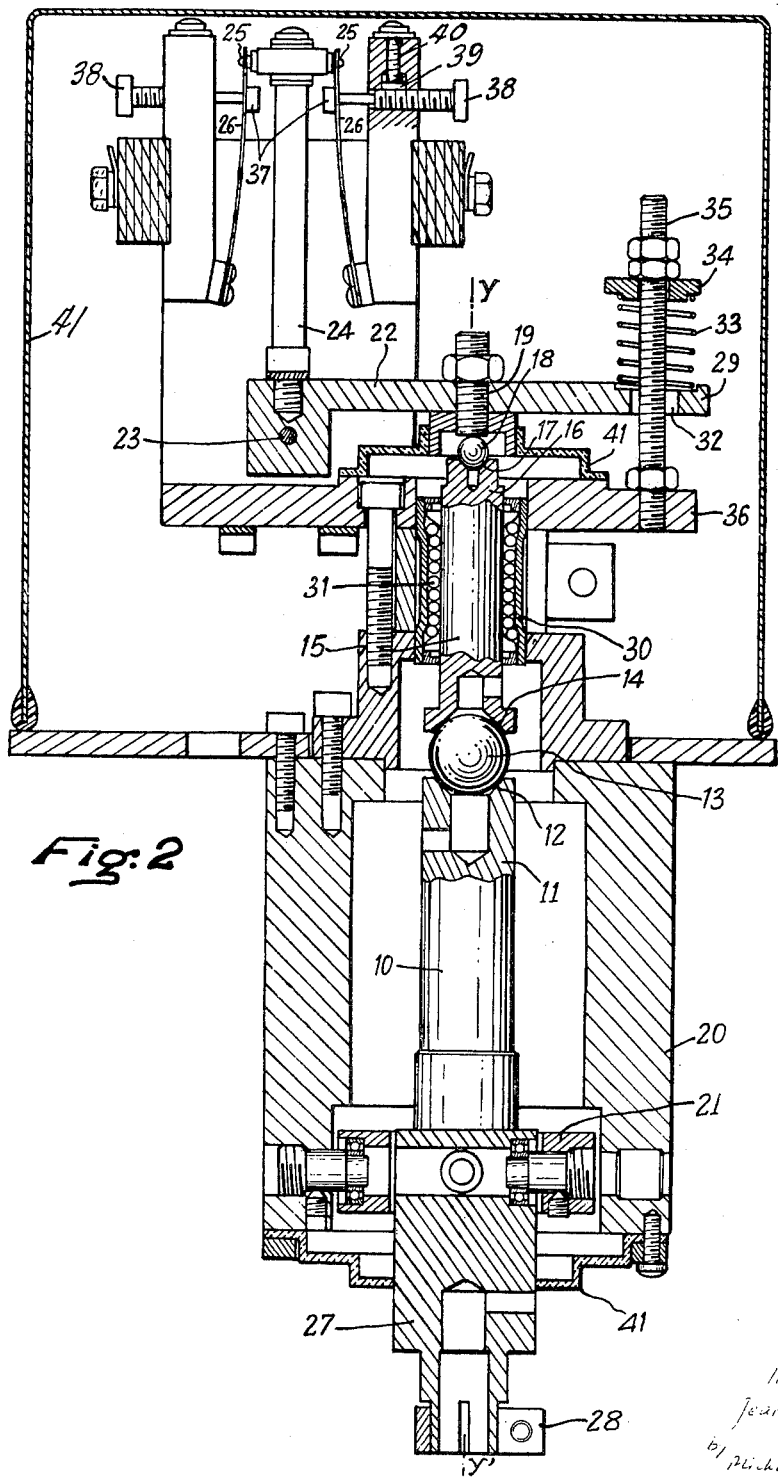
FIGURE 2 is a view in partial section of a feeler according to the invention.

FIGURE 1 shows diagrammatically the end of a feeler of known type. This end 1 comprises a conical recess 2 in which a ball 3 rests. This ball 3 is surmounted by the conical recess 4 of a bearing 5 carried by an arm 6 pivoting about a horizontal pivot pin 7, the end of this arm 6 operating contacts 8 which are carried by flexible strips 9.

When the end 1 of the feeler is displaced laterally, the ball 3 slides along the conical surface 4 of the bearing 5, which causes rotational movement of the arm 6 about its pivot pin 7, this rotational movement acting on the contacts 8.

When the feeler 1 is displaced towards the right in FIGURE 1, that is to say in the direction of the arrow $f_1$, the ball 3 slides along the right-hand portion of the conical surface and the force thus transmitted to the pivoting arm 6 is applied at the point A, whereas when the feeler 1 is displaced towards the left, in the direction $f_2$, the point of application of this force is situated at B and, since the distance O–A is different from the distance O–B, the angle of rotation of the arm 6 is not the same for the same angular displacement of 1 depending on whether this displacement is effected in the direction $f_1$ or in the direction $f_2$.

This lack of correspondence between the angular movement of the end of the feeler 1 and the angular movement of the pivoting arm 6 actuating the contacts 8 is particularly prejudicial to the control of machine tools which have to operate with a tolerance of less than 1/100 of a millimetre.

FIGURE 2 shows in partial side sectional view a device according to the present invention which overcomes this disadvantage.

Referring now to this figure, it will be seen that the feeler 10 is carried by a frame 20 by means of a universal-joint mounting 21, so as to be capable of oscillating about the geometric centre of the universal-joint mounting.

The end 11 of this feeler 10 comprises a conical recess 12 in which a ball 13 rests. This ball 13 is surmounted by the conical recess 14 of a cylindrical slide 15 the axis of which is on the axis Y—Y'.

The upper end 16 of the slide 15, comprises a conical recess 17 in which a ball 18 rests.

This ball 18 is in contact with a screw 19 fast with the arm 22 pivoting about the horizontal pivot pin 23.

A contact-carrying rod 24 screwed to the pivoting arm 22 acts on the studs 25 carried by flexible strips 26.

The other end 27 of the feeler 10 comprises a mandrel for fixing the feeler element proper (not shown) which is clamped by the collar 28.

When the feeler element explores the template, the feeler 10 is subjected to oscillations about the geometric centre of the universal-joint mounting 21. The ball 13 rolls between the opposite walls of the conical recesses 12 and 14, which causes a longitudinal upward displacement of the slide 15, and the latter by means of the ball 18 and the screw 19 lifts the arm 22 which pivots about its pivot 23.

The point of application of the force which causes the arm 22 to pivot is always the point of contact of the ball 18 and the screw 19, and therefore it is fixed relatively to the arm 22, which has the result that the ratio between the angular movement of the said arm 22 and the angular movement of the feeler 10 is always constant.

The feeler according to the present invention has to be sensitive to displacements of several microns, and thus can advantageously comprise the following arrangements:

The slide 15 is guided in its longitudinal movement by a ballbearing having a cylindrical cage 30 comprising a plurality of double ball tracks; in each double ball track there is on the one hand a ball track in which all the balls 31 are in contact with the slide 15 and roll between the slide 15 and the cage 30 when the slide is displaced, and on the other hand a second ball track (not shown in order to leave the drawings clearer to read) which is connected to the first-mentioned track and wherein the balls are not in contact with the slide 15, this second ball track constituting in a sense a ball reserve for the first-mentioned track, so that the balls 31 in contact with the slide 15 always roll on the slide without friction, which gives the device great sensitivity.

The pivoting arm 22 comprises at its end 29 a damping device constituted in the example illustrated here by a spring 33 bearing on the one hand in an abutment collar 34 rendered fast by any suitable means with a rod 35 which is screwed to a fixed point of the apparatus, the plate 36 for example, and extends through an orifice 32 formed through the arm 22, the other end of the said spring bearing on the said arm 22.

The two flexible strips 26 carrying the studs 25 rest against adjustable abutments 37. These abutments are fast with screws 38 which permit the positions of the said abutments 37 to be regulated. In order that a setting once adjusted will remain invariable, the screws 38 are locked by means of mobile screwthreaded half-shells 39 which are clamped against the screws 38 by screws 40.

Preferably, deformable covers 41 are provided for protecting all the mechanism from dust and chips.

The contact control device of the feeler comprises in known manner a safety contact which interrupts the operation of the machine tool when the oscillation of the feeler 10 exceeds a predetermined amplitude. According to the present invention, this electrical safety device is duplicated by a mechanical safety device which makes any deformation of the feeler impossible in the event of violent oscillation over a considerable amplitude.

Referring now to FIGURE 3, it will be seen that the mandrel 42 in which a feeler element proper (not shown in the drawing) is fixed is separable from the feeler 10 and is fixed to the end 27 of the said feeler by means of an intermediate shearing element 43.

This shearing element 43 comprises a collar 44, a central portion 45 and a collar 46.

The end 27 of the feeler comprises a cylindrical portion 47 having exactly the same diameter as the internal bore of the central portion 45 of the element 43. Likewise, the end of the mandrel 42 comprises a cylindrical portion 48 having exactly the same diameter as the internal bore of the central portion 45 of the element 43. A ring 49 screws on to the end 27 and engages on the collar 44, the collar 46 holding the mandrel 42 in a perfectly centered position relatively to the feeler 10.

The element 43 is made of a breakable material, the breaking characteristics of this material having to be substantially constant at ambient temperature, i.e. the said element is to break on the one hand under a specific force and on the other hand this breakage must be almost immediate, without any considerable elastic deformation of the element 43 occurring.

It has been found that the element 43 can be constructed for example of glass or Bakelite but the best results have been obtained with breakable polystyrene.

When the feeler 10 is subjected to a lateral displacement exceeding its operating limits, the end 11 of the feeler impinges against the shoulder 20a of the frame 20; when the force exerted on the feeler proper exceeds a predetermined value, the collar 44 or 50 breaks and the oscillating part 10, 27 of the feeler is disengaged from the element 42. When the element 43 is made of polystyrene, the collar 44 is ruptured only over part of its periphery and the mandrel 42 retained by the collar 46 remains suspended by the elements 43, which prevents the mandrel falling to the ground.

Figure 4:
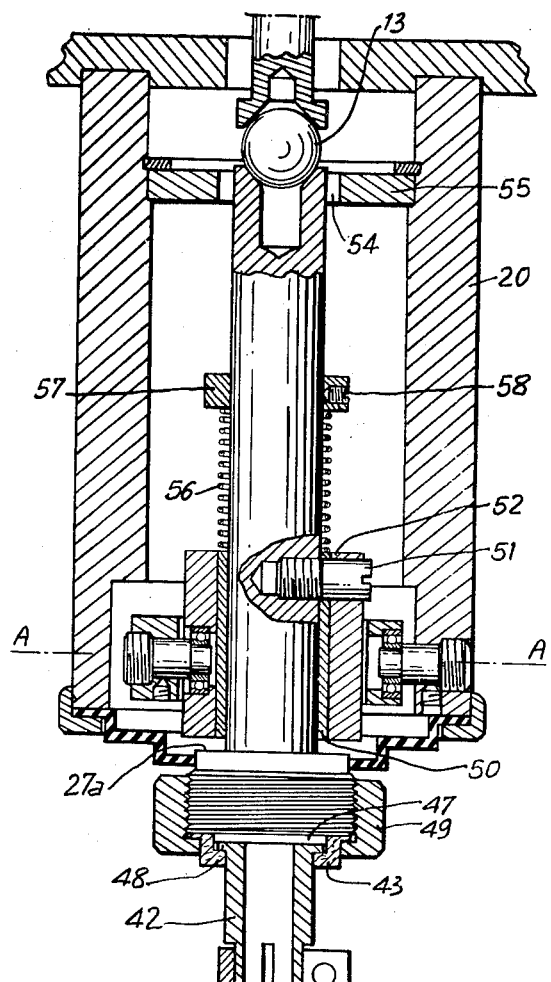
FIGURE 4 is a modified form of embodiment of the feeler according to the invention.
Figure 5:
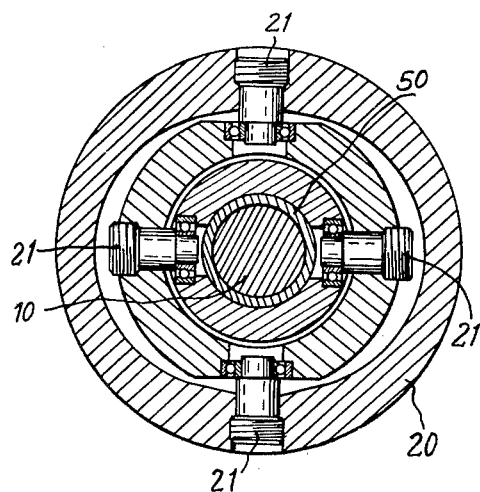
FIGURE 5 is a plan view in section on A—A of FIGURE 4.

FIGURES 4 and 5 show a modified form of embodiment wherein the feeler 10 is free to move in three-dimensional manner.

For this purpose, instead of being directly connected to the universal-joint mounting 21, the feeler 10 is free to slide longitudinally in a sleeve 50.

This longitudinal movement of the feeler 10 is bounded by two abutments constituted on the one hand, for the upward movement, by the shoulder 27a of the end 27 of the said feeler and on the other hand, for the descending movement, by a stud 51 engaging in an aperture 52 formed in the sleeve 50.

The lateral movements of the feeler 10 are limited by the diameter of the orifice 54 formed through a plate 55 fast with the frame 20.

Preferably, electrical safety contacts for the vertical upward movement of the feeler 10 are arranged so as to cause the stoppage of the entire device before the shoulder 27a comes into contact with the base of the sleeve of the universal-joint mounting 21.

It will be seen that it is possible, by means of the stud 51, optionally to render the feeler 10 fast with the sleeve so that it can operate only in two dimensions; likewise it is possible to arrange on the universal-joint mounting 21 suitable means which are not illustrated since they are known, for locking one of the axes of the universal-joint mounting 21 so that the feeler cannot operate except in a single dimension.

The feeler as illustrated in FIGURES 4 and 5 can move in three dimensions, that is to say it can carry out either oscillatory movements when it is subjected to forces situated in a plane perpendicular to its axis, or sliding movements when it is subjected to forces acting along its axis.

In order to obtain a constant sensitivity whatever the method of displacement of the feeler: by oscillation or by sliding, and consequently in order to obtain uniform accuracy and surface condition it is indispensable that the forces to be developed both in a plane perpendicular to the axis and along the axis for obtaining a given displacement of the slide 15 should be equal.

This condition is generally not achieved since in the case of oscillation a lever arm exists owing to the distance separating the point of application of the force acting on the articulation axis of the feeler 10, whereas in the case of sliding along the axial direction, the active force is directly transmitted.

In order to obviate this disadvantage, a compensating spring 56 is arranged one end of which is connected to the sleeve 50 and the other end to a ring 57 adapted to slide along the feeler rod, this ring comprising a locking screw 58.

By regulating the preload of the compensating spring 56 by the position of the ring 57 it is possible to make the forces perpendicular to the axis and the forces acting along the axis strictly equal owing to the small amplitude of the movements of the feeler.

What I claim is:

1. In a machine tool, in combination, support means; a sleeve; universal joint means mounting said sleeve on said support means; a feeler pin having a conical recess at one end thereof and being mounted in said sleeve slidably in axial direction and universally tiltable with said sleeve; arm means pivotally mounted on said support means extending transverse to said feeler pin spaced from said one end thereof and being arranged and constructed for actuating control contacts of drive means for said machine tool; elongated slide means located between said one end of said feeler pin and said arm means, said slide means facing with one end thereof said one end of said feeler pin and being formed at said one end thereof with a conical recess, said slide means being operatively connected at the other end thereof to said arm means; a ball located between said conical recesses so that the movements of said feeler pin will be transmitted by means of said ball and said slide means to said arm means in such a manner that the ratio between the angular movement of said feeler pin and the corresponding angular movement of said arm means will be constant whatever the direction of movement of said feeler pin; and compensating spring means operatively connected to said feeler pin and to said sleeve and constructed and arranged in such a manner that axial displacements of said feeler pin necessitate, for a given amplitude, a force equal to that necessary for displacements of said feeler pin through the same amplitude in a plane perpendicular to its axis.

2. In a machine tool, in combination, support means; a sleeve; universal joint means mounting said sleeve on said support means; a feeler pin having a conical recess at one end thereof and being mounted in said sleeve slidably in axial direction and universally tiltable with said sleeve; arm means pivotally mounted on said support means extending transverse to said feeler pin spaced from said one end thereof and being arranged and constructed for actuating control contacts of drive means for said machine tool; elongated slide means located between said one end of said feeler pin and said arm means, said slide means facing with one end thereof said one end of said feeler pin and being formed at said one end thereof with a conical recess, said slide means being operatively connected at the other end thereof to said arm means; a ball located between said conical recesses so that the movements of said feeler pin will be transmitted by means of said ball and said slide means to said arm means in such a manner that the ratio between the angular movement of said feeler pin and the corresponding angular movement of said arm means will be constant whatever the direction of movement of said feeler pin; a ring mounted on said feeler pin adjustable in axial direction of the latter; means for fixing said ring to said feeler pin in any adjusted position along the length thereof; and a compensating spring about said feeler pin and fixed at opposite ends thereof to said sleeve and to said ring, respectively, said compensating spring constructed so that axial displacements of said feeler pin necessitate, for a given amplitude a force equal to that necessary for displacements of said feeler pin through the same amplitude in a plane perpendicular to its axis.

3. In a machine tool, in combination, support means; a sleeve; universal joint means mounting said sleeve on said support means; a feeler pin having a conical recess at one end thereof and being mounted in said sleeve slidably in axial direction and universally tiltable with said sleeve; arm means pivotally mounted on said support means extending transverse to said feeler pin spaced from said one end thereof and being arranged and constructed for actuating control contacts of drive means for said machine tool; elongated slide means located between said one end of said feeler pin and said arm means, said slide means facing with one end thereof said one end of said feeler pin and being formed at said one end thereof with a conical recess, said slide means being operatively connected at the other end thereof to said arm means; a ball located between said conical recesses so that the movements of said feeler pin will be transmitted by means of said ball and said slide means to said arm means in such a manner that the ratio between the angular movement of said feeler pin and the corresponding angular movement of said arm means will be constant whatever the direction of movement of said feeler pin; means operatively connected to said feeler pin for limiting downward movement of the latter and for fixedly connecting said feeler pin to said sleeve; and means cooperating with said universal joint for locking one of the pivot axes thereof so as to selectively render said feeler pin movable in one, in two, or in three directions.

4. In a machine tool, in combination, support means; a sleeve; universal joint means mounting said sleeve on said support means; a feeler pin having a conical recess at one end thereof and being mounted in said sleeve slidably in axial direction and universally tiltable with said sleeve; arm means pivotally mounted on said support means extending transverse to said feeler pin spaced from said one end thereof and being arranged and constructed for actuating control contacts of drive means for said machine tool; elongated slide means located between said one end of said feeler pin and said arm means, said slide means facing with one end thereof said one end of said feeler pin and being formed at said one end thereof with a conical recess, said slide means being operatively connected at the other end thereof to said arm means; and a ball located between said conical recesses so that the movements of said feeler pin will be transmitted by means of said ball and said slide means to said arm means in such a manner that the ratio between the angular movement of said feeler pin and the corresponding angular movement of said arm means will be constant whatever the direction of movement of said feeler pin; a mandrel coaxially arranged with the other end of said feeler pin; and a shearing element interposed between said other end of said feeler pin and said mandrel, said shearing element being designed so as to center said mandrel on said other end of said feeler pin and being constituted by breakable material such that said material does not undergo any elastic deformation until it breaks under application of a predetermined force.

References Cited by the Examiner
UNITED STATES PATENTS 3,148,590  9/1964  Bancroft et al. _____ 90—62

FOREIGN PATENTS 804,877  5/1951  Germany.
872,597  7/1961  Great Britain.

WILLIAM W. DYER, JR., *Primary Examiner.*

G. A. DOST, *Assistant Examiner.*